March 24, 1970  N. W. BURWELL ET AL  3,501,969
STEPPER DRIVE DEVICE
Filed Sept. 23, 1968
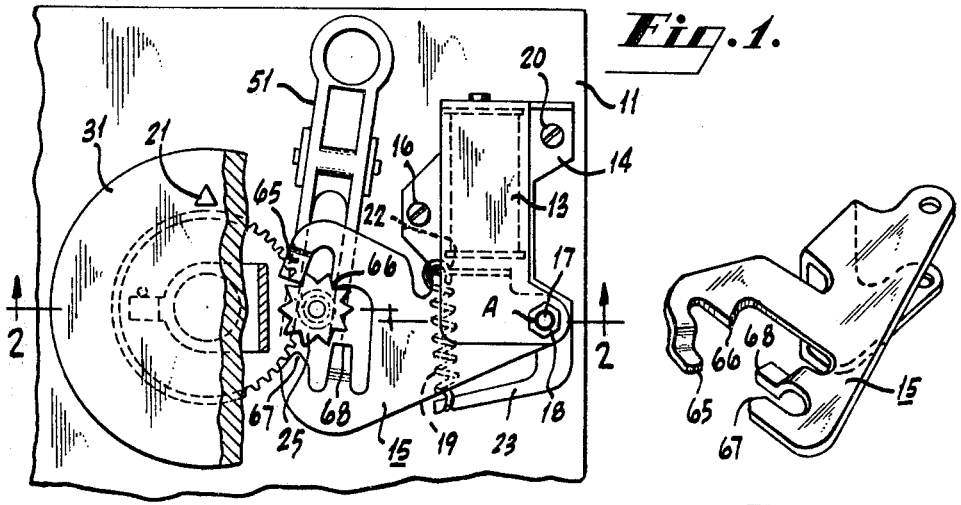
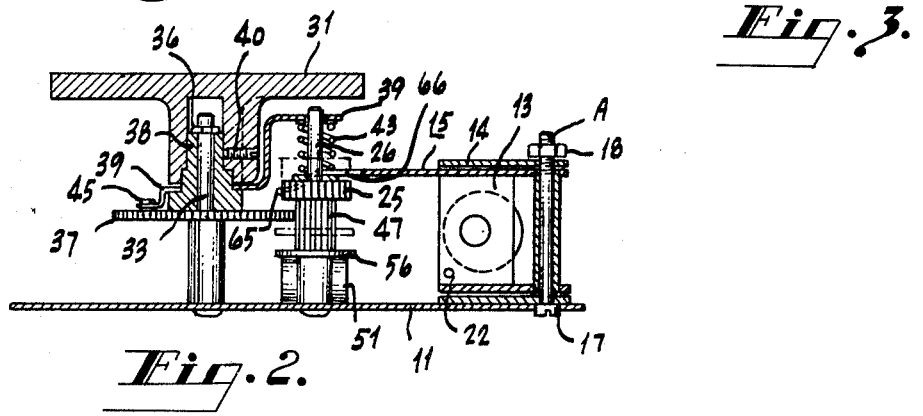
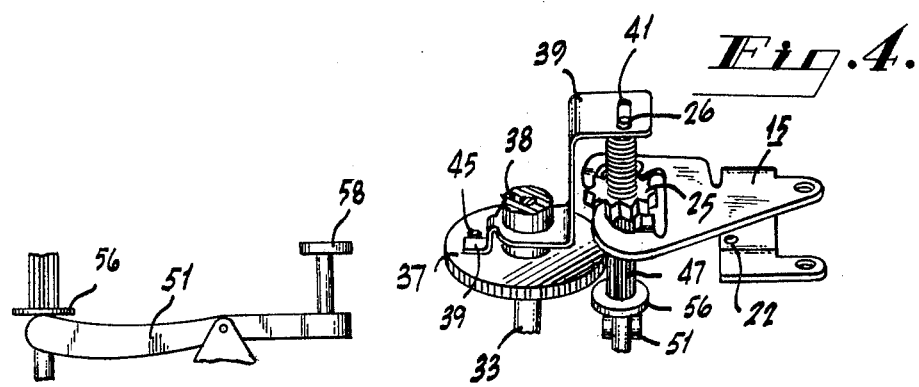
INVENTORS:
NEIL W. BURWELL
JOHN D. CALLAGHAN
FRANKLIN R. DI MEO
BY Edward J Norton
ATTORNEY

United States Patent Office 3,501,969
Patented Mar. 24, 1970

3,501,969
STEPPER DRIVE DEVICE
Neil W. Burwell, Moorestown, John D. Callaghan, Cherry Hill, and Franklin R. Di Meo, Woodbury, N.J., assignors to RCA Corporation, a corporation of Delaware
Filed Sept. 23, 1968, Ser. No. 761,699
Int. Cl. F16h *27/02, 31/00;* G05g *1/00*
U.S. Cl. 74—143                               9 Claims

ABSTRACT OF THE DISCLOSURE

A reversible stepper drive device using a single pawl having four fixed teeth for ratcheting a stepper wheel is described. Two of the fixed teeth in opposed relation to each other are in one given plane perpendicular to the axis of the stepper wheel. The other two of the fixed teeth are in opposed relation to each other and are in a second different plane parallel to the one given plane. The pawl is energized by a single solenoid and a spring to move between two positions and return. The stepper wheel when positioned in the one given plane engages the first pair of teeth and is driven in one direction by the pawl and when positioned in the second plane engages the second pair of teeth and is driven in the reverse direction by the pawl.

BACKGROUND OF THE INVENTION

This invention relates to a stepper drive device and more particularly to a reversible stepper drive device whereby ratcheting of a stepped drive wheel is accomplished by using a single pawl having at least three fixed teeth.

In antenna rotators, for example, it is desirable to remotely indicate the direction that the antenna is pointing. This indication is frequently done by means of a switch that opens and closes a given number of times for one revolution of the antenna support shaft. When this switch closes contact, for example, one or more solenoids may be energized at the remotely located indicator. The energization of a solenoid causes either the stepping of a ratchet wheel by one or two pawls or operates an anchor verge which allows the movement of a spring driven escapement wheel one notch or one tooth per opening and closing action of the switch actuated by the rotation of the antenna support shaft. To provide reversible ratcheting of this indicator two solenoids are generally required, one operating to step the ratchet wheel in one direction and the second one operating to ratchet the wheel in an opposite direction. A single solenoid may be used in combination with other mechanical linkage such as sprung pawl and teeth holding wheels which add additional cost and complexity to the device, making such systems prohibitive in a highly competitive market.

It is an object of this invention to provide an improved reversible stepper drive device using a single pawl.

Other objects and a fuller understanding of the invention may be had by referring to the following description and claims taken in conjunction with the following drawings in which:

FIGURE 1 is a top plan view of a reversible stepper drive device in accordance with an embodiment of the present invention, FIGURE 2 is a cross sectional view of the stepper drive device taken along the line 2—2 of FIGURE 1, FIGURE 3 is a perspective view of a pawl having four teeth used in accordance with the invention, FIGURE 4 is a perspective view of the stepper drive wheel and pawl assembly, and FIGURE 5 illustrates the lever used for actuating a directional change.

Referring to FIGURES 1, 2 and 3, there is shown a platform 11 for supporting the reversible stepper drive device. A solenoid 13 is mounted to frame 14 and this frame is mounted to the platform 11 by screws 16 and 20. The solenoid 13 is coupled to an intermittent power source, not shown. A single pawl 15 is pivotally mounted at point A by means of a bolt 17 and nut 18 to a corner of the solenoid frame 14. A spring 19 is coupled between an aperture 22 located at the solenoid contact surface of the pawl 15 and extended arm 23 of the solenoid frame 14 whereby upon energization of the solenoid by a power source, not shown, the spring is extended due to the movement of the pawl 15 toward the solenoid 13. Upon de-energization of the solenoid 13, the spring 19 pulls the pawl 15 back to the original position.

A star-shaped stepper wheel 25 having ten teeth radially extending is rotatable on a haft 26 which is vertically mounted to the platform 11 at one end and is positioned between the teeth 65 through 68 of pawl 15. An indicator disk 31 having some indication means such as an arrowhead 21 located thereon is shown in FIGURE 1. The disk 31 has a hollow boss. Referring to FIGURE 2 stepped collar 38 is attached to indicator gear 37 and is allowed to rotate on stepped shaft 33. A portion of the collar 38 is mounted inside the hollow boss of disk 31. The disk 31 is held to the stepped collar 38 by set screw 40. An offset stop control arm 39 is placed in a groove between the boss of the disk 31 and the first step of collar 38. One end of stepped shaft 33 is rigidly held to the mounting plate 11 and the other end of stepped shaft 33 has a groove therein for retainer 36 which captivates collar 38 between the retainer 36 and the step of shaft 33. Therefore rotation of gear 37 about shaft 33 also rotates stepped collar 38 and disk 31. One end of stop control arm 39 is offset upward so as to be located above star wheel 25 and a spring 43 at one end of the shaft 26. The shaft 26 is mounted at one end to platform 11 and extends up through an elongated aperture 41 located in the upper end of stop control arm 39 as shown in FIGURE 4. The spring 43 is mounted over the shaft 26 and is retained between the star wheel 25 and the stop control arm 39. The other end of stop control arm 39 is offset downward so as to contact stop pin 45 which extends upward from gear 37. The stop pin 45 is mounted on the top surface of indicator gear 37.

A drive gear 47 is fixed to and is located just below the stepper wheel 25 and engages indicator gear 37. The combined wheel 25 and drive gear 47 are slidable by means of a lever 51 along shaft 26 and the combined star wheel 25 and drive gear 47 are rotatable on the same shaft 26 by means of ratchet pawl 15. A small thrust washer 56 is also slidably located on shaft 26 and is positioned below drive gear 47. Referring to FIGURE 5 a pivoted lever 51 is shown having one forked end thereof located below washer 56 and the other end opposite thereof having a suitable means such as button 58. Upon depressing the button 58, one end of lever 51 is pushed down and the opposite end is pushed up against washer 56. The pawl 15 as described has four teeth 65, 66, 67 and 68 as shown in FIGURE 3. Teeth 65 and 68 are opposed to each other and are in a diagonal opposed relationship and are arranged so as to be in one plane parallel to platform 11 and perpendicular to shaft 26. Diagonally opposed teeth 66 and 67 are in a second plane above that of the plane of teeth 65 and 68 of pawl 15. The relative position of pairs of teeth 65 and 68 and 66 and 67 to the wheel 25 are as shown in FIGURE 1. In each pair one tooth is located beyond the axis of star wheel 25 relative to pivot point A and the opposite tooth is inboard of the axis of star wheel 25 relative to pivot point A.

In operation, when button 58 is not depressed, the spring 43 holds the wheel 25 in its lower position and spring 19 holds tooth 65 of pawl 15 in complete engagement with one of the notches between the teeth of the wheel 25. Upon energization of solenoid 13, pawl 15 is pulled toward solenoid 13 and tooth 65 is moved out of engagement with the wheel 25. Tooth 68 drives the wheel 25 counterclockwise a portion of a wheel tooth increment. Upon de-energization of solenoid 13 spring 19 pulls pawl 15 to its original position and outer tooth 65 drives wheel 25 counterclockwise the remaining portion of a tooth increment, again providing complete engagement of the wheel 25 whereby upon a full cycle of energization and de-energization of the solenoid the wheel 25 moves one tooth or one notch. The other pair of teeth 66 and 67 are clear and above the wheel 25 and consequently have no effect. Drive gear 47 engaged by the wheel 25 drives indicator gear 37 coupled thereto to move the indicator disk 31 in a clockwise direction only.

Upon pressing the button 58, one end of lever 51 is moved down and washer 56, drive gear 47 and wheel 25 are slid upwards in a vertical direction along shaft 26, compressing spring 43. Tooth 66 is located in relation to tooth 65 so that the wheel 25 may freely slide upward without rotation, disengaging itself from tooth 65 and engaging tooth 66. Wheel 25 is therefore raised to the plane of teeth 66 and 67 of pawl 15 and is clear of teeth 65 and 68. Upon energization of solenoid 13, pawl 15 is pulled toward solenoid 13 and tooth 67 drives wheel 25 clockwise a portion of a wheel tooth increment and upon de-energization of solenoid 13, spring 19 pulls pawl 15 to its original position and inner tooth 66 of pawl 15 drives the wheel 25 clockwise the remaining portion of a wheel tooth increment. Drive gear 47 which is still engaged with gear 37 causes indicator gear 37 and disk 31 to rotate now in a counterclockwise direction.

While not necessary to the operation of the invention, this described embodiment limits rotation to one complete 360° revolution of indicator disk 31 by means of elongated slot 41 of stop arm 39 in FIGURE 4 whereby when stop arm 39 hits stop pin 45, an additional rotation is allowed by the lost motion provided by 41 to compensate for the thickness of stop pin 45 and that portion of stop arm 39 that comes in contact therewith.

It is to be understood that, for example, three teeth may be used instead of four wherein two teeth are in different planes relative to a single third opposed tooth wherein one of the two teeth acts to drive the wheel more than one-half of a wheel increment in one direction and the third opposed tooth drives the wheel the remaining portion of the wheel increment. The second of the two teeth drives the wheel more than one-half of a wheel increment in the reverse direction and the third opposed tooth drives the wheel the remaining portion of the wheel increment in the reverse direction. Also, the pawl may be moved to change the pair of teeth controlling movement rather than moving the star wheel.

What is claimed is:

1. A single stepper wheel having teeth extending substantially radially from the center of the wheel,
 a pawl having at least three teeth wherein a given two teeth of said three teeth are in opposed relation to the third tooth,
 means for causing said pawl to move between two positions and return,
 means for positioning said wheel relative to said teeth to cause rotational drive of said wheel in one direction by one of said two given teeth and said third tooth, and
 means for positioning said wheel relative to said teeth to cause rotational drive of said wheel in an opposite direction by the second one of said two given teeth and said third tooth.

2. In combination,
 a pawl having at least four teeth wherein a first two of said four teeth in opposed relation to each other form a first pair and wherein a second two of said four teeth in opposed relation to each other form a second pair, said first pair of teeth being in one given plane and said second pair of teeth being in a plane parallel to and different from said one plane,
 means for causing said pawl to move between two positions and return,
 a single stepper wheel having teeth extending substantially radially from the center of the wheel,
 a shaft,
 said wheel positioned on said shaft substantially perpendicular to said given plane,
 means for positioning said wheel relative to said first pair of teeth to cooperate with said first pair of teeth to control the rotataional drive of said wheel in one direction, and
 means for positioning said wheel relative to said second pair of teeth to cooperate with said second pair of teeth to control the rotational drive of said wheel in the direction reverse said one direction.

3. The combination as claimed in claim 2 wherein said means for causing said pawl to move between two positions and return includes a single solenoid and a spring.

4. The combination as claimed in claim 3 wherein said first pair of pawl teeth are in opposed diagonal position and wherein siad second pair of pawl teeth are in opposed diagonal position.

5. The combination as claimed in claim 3 wherein said wheel is slidably positioned on said shaft.

6. The combination as claimed in claim 5 wherein said means for positioning said wheel relative to said first pair of teeth includes a spring about said shaft on one end of said wheel.

7. The combination as claimed in claim 6 wherein said means for positioning said wheel relative to said second pair of teeth includes a lever wherein one end upon being depressed the opposite end of the lever slides said wheel along said shaft against said spring.

8. The combination as claimed in claim 7 wherein one of said first pair of teeth controls the rotational drive for a portion of a stepper wheel increment and the opposed tooth of said first pair of teeth controls the rotational drive of said stepper wheel the remaining portion of the stepper wheel increment.

9. In combination,
 a ratchet wheel having teeth extending substantially radially from the center of the wheel,
 a pawl having at least four teeth,
 a first pair of said pawl teeth being in diagonal opposed relation to each other and in one given plane,
 a second pair of said pawl teeth being in opposed diagonal relation parallel and above said first plane,
 a single solenoid, said pawl being pivotally positioned near said solenoid whereby upon energization of said solenoid said pawl is moved in only one direction,
 a return spring coupled to said pawl whereby upon de-energization of said solenoid said pawl is moved in an opposite direction,
 means for providing periodic energization of said solenoid,
 a shaft positioned substantially perpendicular to said one given plane,
 said ratchet wheel slidably mounted on said shaft,
 means for slidably positioning said ratchet wheel relative to said first pair of teeth to cooperate with said first pair of teeth whereby upon energization of said solenoid the opposite one of said first pair of teeth ratchets said ratchet wheel a portion of a tooth increment and whereby upon de-energization of said solenoid and said return spring action said ratchet wheel is rotated the remaining portion of tooth increment, means for slidably positioning said wheel relative to said second pair of teeth to cooperate with said second pair of teeth whereby upon energization of said solenoid one of said first pair of teeth ratchets said ratchet wheel a portion of an increment and upon de-energization of said solenoid and said return spring action the other of said second pair of teeth ratchets said ratchet wheel the remaining portion of a tooth increment in a direction reverse of said one direction provided by said first pair of teeth.

References Cited

UNITED STATES PATENTS 3,373,622   3/1968   Stautmeister _____ 74—143

FOREIGN PATENTS 521,472   3/1955   Italy.

FRED C. MATTERN, Jr., Primary Examiner

W. S. RATLIFF, Jr., Assistant Examiner

U.S. Cl. X.R.

74—5.77